United States Patent
Cords et al.

[11] Patent Number: 5,857,479
[45] Date of Patent: Jan. 12, 1999

[54] PRECONTROLLED THREE-WAY PRESSURE REDUCTION VALVE

[75] Inventors: Karl Cords, Partenstein; Götz-Dieter Machat, Lohr/Main; Karl-Josef Meyer, Rieneck; Michael Schulte, Frammersbach; Wilfried Stroka, Partenstein, all of Germany

[73] Assignee: Mannesmann Rexroth AG, Lohr/Main, Germany

[21] Appl. No.: 750,094
[22] PCT Filed: May 24, 1995
[86] PCT No.: PCT/EP95/01977
§ 371 Date: Jan. 25, 1996
§ 102(e) Date: Nov. 25, 1996
[87] PCT Pub. No.: WO95/33231
PCT Pub. Date: Dec. 7, 1995

[30] Foreign Application Priority Data

May 27, 1994 [DE] Germany .................. 44 18 524.3

[51] Int. Cl.⁶ .................................................. G05D 16/10
[52] U.S. Cl. .................................. 137/116.3; 137/115.15; 137/115.23
[58] Field of Search ..................... 137/116.3, 115.15, 137/115.23

[56] References Cited

U.S. PATENT DOCUMENTS

| 2,971,524 | 2/1961 | Ruhl | 137/115.23 X |
| 4,531,707 | 7/1985 | Dotti et al. | 251/30.01 X |
| 4,676,273 | 6/1987 | Stoltman | 137/625.64 X |
| 5,251,660 | 10/1993 | Hori et al. | 137/596.1 X |

FOREIGN PATENT DOCUMENTS

| 1378731 | 10/1964 | France . |
| 2444968 | 7/1980 | France . |
| 2413273 | 9/1975 | Germany . |
| 2547646 | 4/1977 | Germany . |
| 2602844 | 8/1977 | Germany . |
| 7800261 | 4/1978 | Germany . |
| 3125143 | 1/1983 | Germany . |
| 3318246 | 11/1984 | Germany . |
| 3626043 | 2/1988 | Germany . |
| 3921292 | 1/1991 | Germany . |

OTHER PUBLICATIONS

Pippenger J.J. 'hydraulic cartridge valve technology' 1990. Amalgam Publishing Company, USA p. 142.

Primary Examiner—Gerald A. Michalsky
Attorney, Agent, or Firm—Martin A. Farber

[57] ABSTRACT

A precontrolled three-way pressure reduction valve having essentially vibration-free operation is encased in a cartridge and has a hollow control piston wherein a working fluid space is formed as a T-shaped cavity within the control piston. In the cavity, there are axial and transverse bores of approximately the same diameter. A groove encircles the control piston, and has a width which is slightly larger than a diameter of the transverse bore, the transverse bore communicating with the groove.

10 Claims, 1 Drawing Sheet

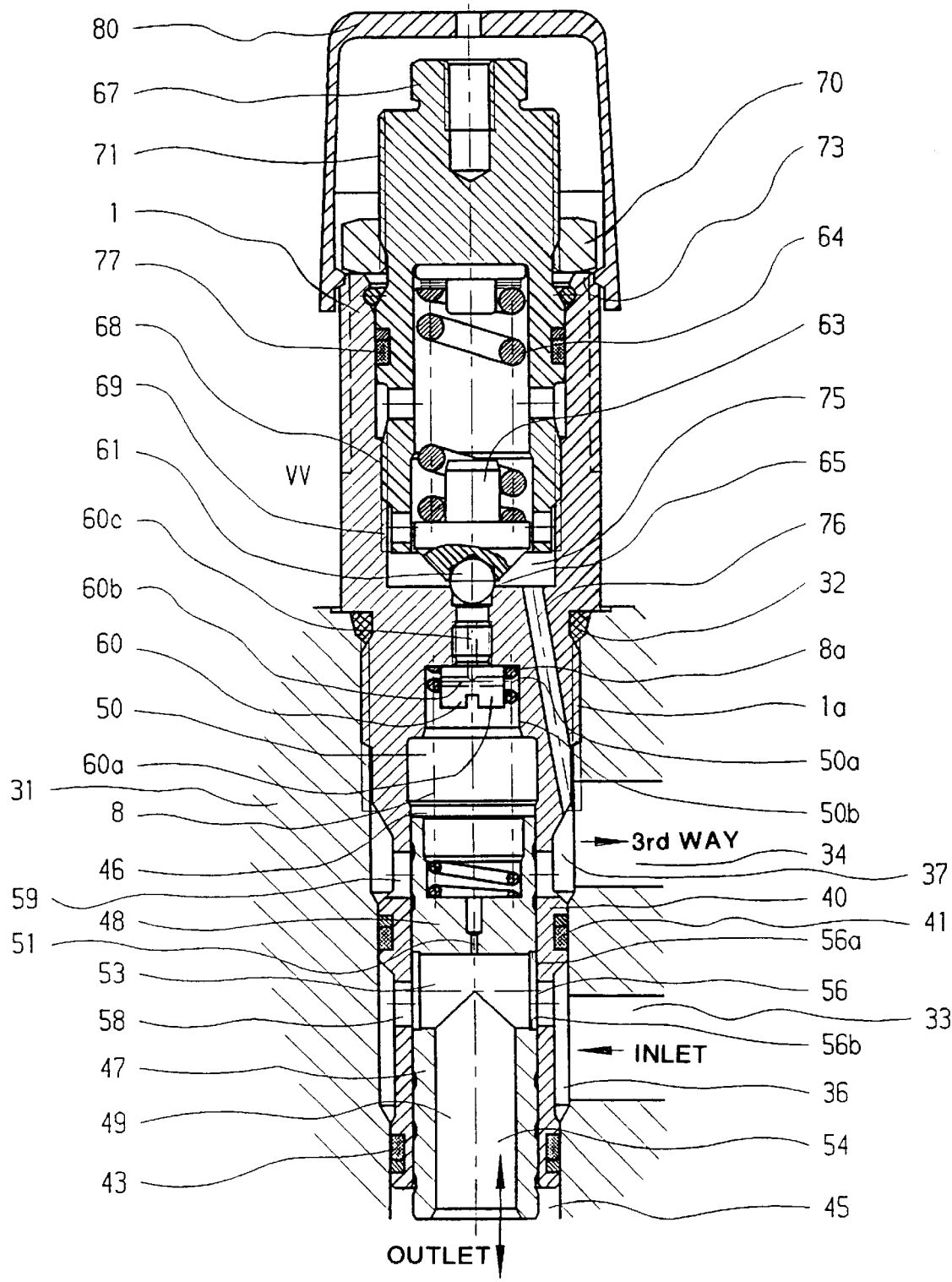

5,857,479

PRECONTROLLED THREE-WAY PRESSURE REDUCTION VALVE

FIELD AND BACKGROUND OF THE INVENTION

The present invention relates to a precontrolled three-way pressure reduction valve having a hollow piston separating a working liquid space from a control liquid space.

These pressure reduction valves readily tend to oscillate, so that special measures must be taken in order to stabilize them. The connecting openings between the surrounding groove of the control piston and the working liquid space are provided in large number over the circumference and arranged in two rows so that a good distribution of the working liquid from the groove into the working liquid space which is in communication with the consumers, and vice versa, is assured. This requires a considerable expense for the manufacture of the control piston, which is developed as hollows piston having a partition.

SUMMARY OF THE INVENTION

The object of the present invention is to obtain, at little cost of manufacture, a pressure reduction valve which operates substantially free of oscillation. This is surprisingly achieved by providing a working liquid space located in the control piston and having a T-shape with axial and transverse bores, there being a groove encircling the control piston and communicating with the transverse bore. Due to the fact that the working liquid space is developed as a T-channel, excessive eddying of the work liquid in this space is substantially prevented, so that a high degree of stability during the control process can be obtained as a result of this specific guidance of the working liquid. Furthermore, the stability of the control process is additionally favored by the special development of the damping choke which is arranged in front of the precontrol valve. The development of the T-channel of the working liquid space formed by the main control piston requires merely a longitudinal bore which debouches into a transverse bore.

BRIEF DESCRIPTION OF THE DRAWING

With the above and other objects and advantages in view, the present invention will become more clearly understood in connection with the detailed description of a preferred embodiment, when considered with the accompanying drawing in which the sole FIGURE is an axial section through a precontrolled three-way pressure reduction valve according to the invention.

DETAILED DESCRIPTION OF THE PREFERRED EMBODIMENT

The precontrolled three-way pressure reduction valve developed in cartridge form has a sleeve 1 which forms the housing and which is screwed by a thread 1a in liquid-tight manner by means of a sealing ring 32 into an internal thread in a receiving housing 31. This receiving housing 31 has channels 33 and 34 which are in liquid communication with circumferential grooves 36 and 37 in the sleeve-shaped housing 1. The channel 33 communicates with the pump connection, and the channel connection 34 communicates with the tank connection. The circumferential grooves 36 and 37 are separated from each other by a sealing rib 40 with sealing ring 41. The other sealing ring 43 seals the circumferential groove 36 off from the consumer connection 45. The bore portion 46 of the housing sleeve 1 is developed as cylindrical guide for the control piston 47. The control piston has a partition 48 which separates the working liquid space 49 from the control space 50. In the central region, the partition wall has a throttle bore 51 through which control liquid flows from the working liquid space 49 into the control space 50. The working liquid space 49 is developed in T-shape, consisting of a transverse bore 53 which an axial bore 54 debouches. The transverse bore 53 debouches into a surrounding groove 56 the limiting walls 56a, 56b of which form control edges which cooperate with radial bores 58 and 59 in the housing sleeve 1. In the case of the present embodiment, six radial bores 58 and six radial bores 59 are, for instance, arranged distributed uniformly on the circumference of the sleeve 1. The radial bores 58 are in communication with the surrounding groove 36 which, in its turn, communicates with the pump channel 33. The radial bores 59 debouch into the surrounding groove 37 which, in its turn, communicates the tank channel 34.

In the position of the control piston shown, the consumer connection 45 is connected via the T-shaped cavity 53, 54 of the surrounding groove 56, the radial bores 58 of the surrounding groove 36 with the pump channel 33. Via the choke bore 51 in the partition 48 of the control piston, the same pressure acts in the control space 50 as in the working liquid space 49. This pressure now acts on its part via a damping choke 60 on the closure member 61 of the precontrol valve VV. The closure member 61 is of spherical shape and is pressed via the cup spring 63 by the compression spring 64 onto the seating surface 65. The initial tension of the compression spring 64 is set by the hollow screw-in member 67 against which the one end of the compression spring 64 rests. The screw-in member 67 has a screw thread 68 which engages into an internal thread 69 of the housing sleeve 1 in form-locked and force-locked manner. The adjustment of the initial stress which is established by the depth of insertion of the screw-in member is fixed by the lock nut 70 which is threaded on another thread 71 of the screw-in member 67 and is pulled firmly against the upper end surface 73 of the housing sleeve 1. The valve space or spring space 75 of the precontrol valve is connected, via an obliquely extending channel 76, in the housing sleeve 1 with the tank channel 34 of the receiving housing 31. The valve space 75 is sealed off from the outside by packing rings 77. A hood 80 protects and secures the screw-in member 67 against external influences.

The damping choke 60 provided between precontrol valve VV and control space 50 is developed as screw-in member having a cylindrical head part 60a. The choke bore has a T-shaped course and is formed by a transverse bore 60b in the head part 60a and axial bore 60c. Before the control liquid strikes the closure member 61, the liquid is deflected 90 degrees by the T-shaped development of the choke bore and a further damping effect is thus obtained. This damping effect is further favored by the fact that the control liquid must first of all pass through the annular space 58a between the head part 60a of the damping choke and the limiting wall 50b of the control space 50 before it enters into the transverse bore 60b of the damping choke. An additional damping effect is obtained by a spring end 8a of the compression spring 8 which acts on the control piston 47 in the direction of the connection 45 and lies in said annular space 58, thus additionally constricting said space.

As soon as the opening pressure of the precontrol valve VV which has been set on the compression spring 64 is reached, the closure member 61 lifts off from its seat surface 65 against the force of the spring 64 and establishes a connection, via the damping choke 60, between control space 50 and valve space or spring space 75 of the precontrol valve. The control liquid which thus flows into the valve space 75 is fed back via the channel 76 to the tank channel 34. As soon as the precontrol valve VV opens and the pressure in the working liquid space 49 increases further, the control piston 47 moves in the direction of the control space 50 until the control edge 56a of the surrounding groove connects the working liquid space 49 with the radial bores 59 which are connected via the tank channel 34 to the tank. By this connection, sufficient working liquid is conducted to the task through the working liquid space 49 on the consumer side until the pressure corresponds to the pressure set on the precontrol valve VV. As soon as this pressure is reached, the precontrol valve closes and, by the pressure equality which is again established on the control piston via the choke bore 51, the control piston is shifted again by the slight force of the control spring 8 acting on it in the direction of the consumer connection 45 and thereby interrupts the connection between working liquid space 49 and the radial bores 59 which are in communication with the tank. The axial spacing of the control edges 56a, 56b is slightly less than the axial spacing of the radial bores 58, 59, so that when the pressure set on the precontrol valve is reached the control piston lies with the surrounding groove 56 between the two rows of radial bores. As soon as a change in pressure on the consumer side takes place, the control piston 47 moves in either the one or the other direction and, via the control edges 56a, 56b, connects the consumer side 45 via the radial bores 58, 59 in the housing sleeve 1 either with the tank (in the event of an increase in pressure) or with the pump (in the event of a decrease in pressure). During this control process, no substantial oscillations of the control piston 47 occur, since pressure peaks occurring on the computer side are substantially intercepted by the special development of the control piston and of the damping choke, and the precontrol range is thus not first reached.

The amount of control liquid discharging to the tank during the control process via the control space 50 as well as the valve space 75 and the connecting channel 76 is determined by the size of the cross section of the choke bore 51. In order to prevent the danger of dirtying, the nozzle or the choke bore 51 has a diameter of about 0.7 mm, while the damping choke 60 has a diameter of about 0.9 mm.

We claim:

1. A precontrolled three-way pressure reduction valve of cartridge construction comprising a hollow control piston which has a partition which separates a working liquid space from a control space, the partition having a sore for connection of the control liquid space with the working liquid space, the hollow piston is encircled, in the control space, by a surrounding groove having axial limiting walls which form control edges which cooperate with radial bores of a guide sleeve, the surrounding groove is in communications with the working liquid space via radial recesses in a region of the groove of the control piston, and a damping choke is provided between a closure member which cooperates with a valve seat and is acted on by a force and the control space, and the control piston is urged in opening direction towards a pump side by a spring arranged in the control space, where the working liquid space comprises a T-shaped cavity in the control piston, the cavity having an axial bore debouching into a transverse bore, the axial and the transverse bores having approximately the same diameter, a width of the surrounding groove being slightly greater than a diameter of the transverse bore debouching into said groove.

2. A precontrolled three-way pressure reduction valve according to claim 1, further comprising a precontrol valve, wherein the damping choke is arranged in front of the precontrol valve and has a right-angle channel guide.

3. A precontrolled three-way pressure reduction valve according to claim 1, further comprising a precontrol valve, wherein the damping choke is arranged in front of the precontrol valve and and has a T-shaped channel guide.

4. A precontrolled three-way pressure reduction valve according to claim 3, wherein the damping choke has an axial bore and a transverse bore, the axial bore of the damping choke points in the direction of the precontrol valve, and the transverse bore of the damping choke lies in the control space.

5. A three-way pressure reduction valve according to claim 4, wherein the damping choke is developed as a screw-in member having a cylindrical head part provided with the transverse bore, an annular space being provided between the head part and the control space in order to receive one end part of a spring which urges the control piston towards a consumer side of the pressure reduction valve.

6. A precontrolled three-way pressure-reduction valve of cartridge construction, comprising:
   a hollow control piston,
      which has a partition,
         which separates a working liquid space from a control space,
         and in which a bore connecting the control liquid space with the working liquid space is arranged,
      which piston has a surrounding groove in the control region.
         the axial limiting walls of which form control edges which cooperate with radial bores of a guide sleeve,
         and which is in communication with the working liquid space via cavities in the region of the groove of the control piston,
      and which is urged in the opening direction towards a pump side by a spring arranged in the control liquid space,
   wherein the liquid working space is formed by a T-shaped cavity in the control piston, an axial bore debouching into a transverse bore and the two bores having approximately the same diameter, and the width of the surrounding groove being slightly greater than the diameter of the transverse bore debouching into said groove; and
   the pressure-reduction valve further comprises a precontrol valve having a closure member, and wherein the closure member of the precontrol valve is acted on by a force and cooperates with a valve seat, a damping choke is provided between the closure member of the precontrol valve and the control liquid space, and the damping choke has a right-angle channel guide.

7. A precontrolled three-way pressure-reduction valve of cartridge construction, comprising:
   a hollow control piston,
      which has a partition,
         which separates a working liquid space from a control space,
         and in which a bore connecting the control liquid space with the working liquid space is arranged,
      which piston has a surrounding groove in the control region.
         the axial limiting walls of which form control edges which cooperate with radial bores of a guide sleeve,
         and which is in communication with the working liquid space via cavities in the region of the groove of the control piston, and which is urged in the opening direction towards a pump side by a spring arranged in the control liquid space, wherein the liquid working space is formed by a T-shaped cavity in the control piston, an axial bore debauching into a transverse bore and the two bores having approximately the same diameter, and the width of the surrounding groove being slightly greater than the diameter of the transverse bore debouching into said groove; and the pressure-reduction valve further comprises a precontrol valve having a closure member, and wherein the closure member of the precontrol valve is acted on by a force and cooperates with a valve seat, a damping choke is provided between the closure member of the precontrol valve and the control of liquid space, and the damping choke has a T-shaped channel guide.

8. A precontrolled three-way pressure reduction valve according to claim 7, wherein the T-shaped channel guide of the damping choke has an axial bore and a transverse bore, the axial bore of the damping choke points in the direction of the precontrol valve, and the transverse bore of the damping choke lies in the control liquid space.

9. A three-way pressure-reduction valve according to claim 8, wherein the damping choke is developed as a screw-in member having a cylindrical head part which has the transverse bore, an annular space to receive the one end part of the spring acting on the control piston, the annular space being provided between the head part and the control liquid space.

10. A precontrolled three-way pressure-reduction valve of cartridge construction, comprising:

a hollow control piston,
  which has a partition,
    which separates a working liquid space from a control space,
    and in which a bore connecting the control liquid space with the working liquid space is arranged,
  which piston has a surrounding groove in the control region,
    the axial limiting walls of which form control edges which cooperate with radial bores of a guide sleeve,
    and which is in communication with the working liquid space via cavities in the region of the groove of the control piston,
  and which is urged in the opening direction towards a pump side by a spring arranged in the control liquid space, wherein the liquid working space is formed by a T-shaped cavity in the control piston, an axial bore debauching into a transverse bore and the two bores having approximately the same diameter, and the width of the surrounding groove being slightly greater than the diameter of the transverse bore debauching into said groove; and the pressure-reduction valve further comprises a damping choke which is provided between the control liquid space and the closure member of a precontrol valve, which closure member is acted on by a force and cooperates with a valve seat.

* * * * *